Sept. 28, 1943.  L. D. HILTON  2,330,425
PACKING RING
Filed Dec. 22, 1941

Inventor
Lewis D. Hilton
By Jack A. Schley
Attorney

Patented Sept. 28, 1943

2,330,425

UNITED STATES PATENT OFFICE 2,330,425

PACKING RING

Lewis D. Hilton, Houston, Tex.

Application December 22, 1941, Serial No. 423,936

3 Claims. (Cl. 285—139)

This invention relates to new and useful improvements in packing rings.

It is one object of this invention to provide an improved packing ring which is self-sealing and adapted to be used in conjunction with other types of packing members to supplement their packing action, and which is adapted to be frictionally held to the packing member.

A further object of the invention is to provide an improved packing ring adapted to be used in conjunction with the usual packing ring disposed in a tubing head or casing head or some similar structure, and which is adapted to be distorted into a packing position at the same time as the usual ring.

Yet another object of the invention is to provide an improved packing ring which is split so that it may be placed in position around a tubular member passing through a head structure without necessitating the removal of the tubular member from the head.

A construction designed to carry out the invention will be hereinafter described, together with other features of the invention.

Figure 1:
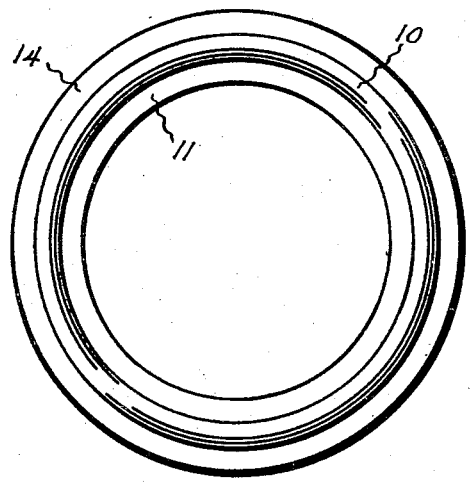
Figure 2:
Figure 4:
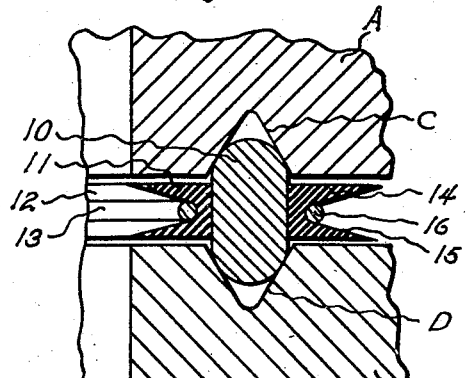
Figure 3:
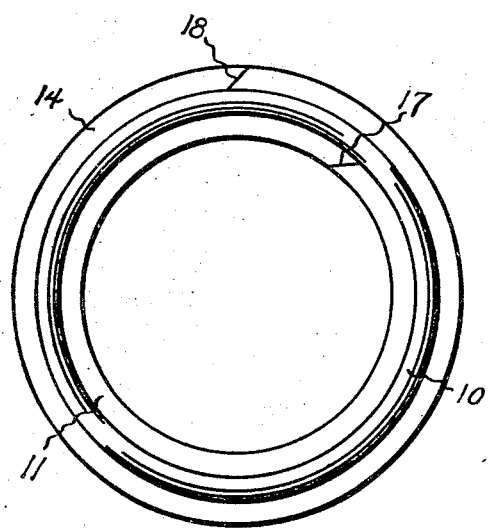
Figure 6:
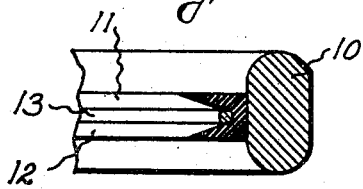
Figure 5:
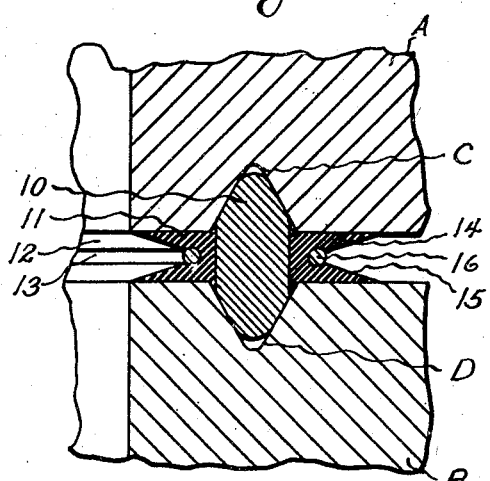

The invention will be more readily understood from a reading of the following specification and by reference to the accompanying drawing, in which an example of the invention is shown, and wherein:

Figure 1 is a view in elevation of a packing ring having auxiliary packing rings on either side thereof, constructed in accordance with the invention, Figure 2 is a diametrical sectional view of Figure 1, Figure 3 is a view similar to Figure 1, and showing a split structure of the auxiliary packing rings, Figure 4 is an enlarged fragmentary view showing the packing rings in position in a head, Figure 5 is a view similar to Figure 4, and showing the packing rings in a packed-off or distorted position, and Figure 6 is a fragmentary sectional view of a modification of the invention.

In the drawing, the numeral 10 designates a packing ring. This ring may be a metallic ring such as the A. P. I. ring which is in common use throughout the oil industry, or may be any other type of packing ring which is adapted to be engaged between two members so as to pack off the space therebetween. For reasons of simplicity, an A. P. I. ring is shown in the drawing. No claim is made to this ring.

An auxiliary packing ring 11, embodying this invention, is adapted to be placed within and without the ring 10 so as to supplement the packing action of this ring. The auxiliary ring may be used on either the inside or the outside of the ring 10, or may be used at both locations.

The inner ring 11 fits snugly within the ring 10 so as to abut the inner surface thereof. The ring 11 is rectangular in cross section and is provided with an annular V-shaped groove 12 around its inner peripheral surface. A split wire ring 13 is disposed within the apex of the groove 12 so as to hold the ring 11 in a radially expanded position in snug engagement with the inside of the ring 10. The ring 11 may be formed of rubber or neoprene, or any other suitable and desirable material.

A similar ring 14 encircles the outside of the ring 10 and is formed of a suitable material as the ring 11. The ring 14 is provided upon its outer peripheral surface with a V-shaped annular groove 15 similar to the groove 12, and a split wire ring 16 is disposed in the apex thereof so as to urge the ring 14 into snug engagement with the outside of the ring 10.

The wire rings 13 and 16, in addition to helping hold the rings 11 and 14 in position, also act to spread the rings so as to hold the grooves 12 and 15 open.

The ring 10 is adapted to be engaged between an upper member A and a lower member B and is disposed within annular grooves C and D formed in the members A and B, respectively, as is shown in Figure 4. As the members A and B are forced together, the ring 10 is deformed, as shown in Figure 5, into a packing position, and at the same time the rings 11 and 14 are distorted by the members into a packing position. The rings supplement the packing action of the ring 10, and in addition, by reason of the V-shaped grooves 12 and 15, act as self-sealing packers or packing rings. Fluid pressure engaging the rings 11 and 14 act upon the grooves so as to force the rings into a more intimate packing relation with respect to the members A and B and the ring 10. The greater the fluid pressure exerted, the more intimate will be this packing relation.

As shown in Figures 4 and 5, the inner auxiliary ring 11 may, if desired, be extended to the edge of a bore 11' passing through the members A and B, so as to protect the edges of the bore and the surfaces of the members from erosion and corrosion. Thus, the ring may be made of any desired cross-sectional width, to extend to such a bore, or to a point which it is desired to protect.

Also, the presence of the rings 11 and 14 protect the ring 10, which is usually made of some suitable metal, from the corrosive action of fluids present, and the erosion of fluids flowing thereby or thereupon. The rings 11 and 14, being formed of neoprene or some similar material, are more resistant to corrosion and erosion than the metallic ring 10. Thus, in addition to its packing action, the ring 10 acts as a support or holding member to hold the rings 11 and 14 in position and allows the rings to bear the brunt of the corrosive and erosive action of fluids or fluid-borne solids which may be present.

As is shown in Figure 3, the rings 11 and 14 may be split at 17 and 18, respectively, so that they may be utilized to replace worn packing rings surrounding a member (not shown), such as a pipe extending through the bore 11', without necessitating the removal of the member from within the ring 10. The ring 10 may be left in position and the split rings opened so as to pass around the member to be packed off and then closed and placed in position inside and outside of the ring 10. The wire rings 13 and 16 are also split as shown at 19 in Figure 2, and may be opened to pass around the member and be engaged within the rings 11 and 14.

If desired, only one of the rings 11 and 14 may be utilized as is illustrated in Figure 6, wherein only the inner ring 11 is used. In other instances it may be desirable to use only the outer ring 14, and such may be done.

Thus, packing rings are provided which supplement the packing action of the ordinary type of packing rings, and which are self-sealing and protect the usual packing ring against corrosion and erosion, and which may be frictionally secured to the ordinary type of packing ring.

Various changes, alterations and modifications may be made in the size, shape and arrangement of the herein described elements, within the scope of the appended claims.

What I claim and desire to secure by Letters Patent is:

1. The combination with a pair of members having flat surfaces adapted to be fastened together with the surfaces contiguous to each other of a sealing means including, a metallic ring engaging within an annular channel formed in said contiguous surfaces and movable to a sealing position when the surfaces are drawn together, an elastic ring interposed between the surfaces and disposed concentrically adjacent the metallic ring, the elastic ring having annular flared lips formed on its peripheral surface farthest from said metallic ring to provide an intermediate groove, and means within the groove for distorting the lips into engagement with said contiguous surfaces and for maintaining said elastic ring in close proximity to the metallic ring.

2. The combination with a pair of members having flat surfaces adapted to be fastened together with the surfaces contiguous to each other of a sealing means including, a metallic ring engaging within an annular channel formed in said contiguous surfaces and movable to a sealing position when the surfaces are drawn together, an elastic ring interposed between the surfaces concentric to the metallic ring and having one of its peripheral surfaces in engagement therewith, the elastic ring having an annular V-shaped groove formed in its other peripheral surface to provide flared lips which are adapted to be distorted into sealing engagement with said surfaces, and resilient means within the groove for distorting the lips and maintaining said elastic ring in engagement with said metallic ring.

3. The combination with a pair of members having flat surfaces adapted to be fastened together with the surfaces contiguous to each other of a sealing means including, a metallic ring engaging within an annular channel formed in said contiguous surfaces and movable to a sealing position when the surfaces are drawn together, a pair of concentric elastic rings interposed between the surfaces internally and externally of the metallic ring with their respective adjacent peripheral surfaces in engagement with said metallic ring, the internal and external elastic rings having annular flared lips formed on their respective external and internal peripheral surfaces to provide intermediate grooves therein, and resilient means within each groove for distorting the lips into engagement with said contiguous surfaces and for maintaining each elastic ring in engagement with the metallic ring.

LEWIS D. HILTON.